Sept. 14, 1965   H. C. DOANE   3,206,723
VEHICLE DUAL INTENSITY WARNING SIGNAL CIRCUIT
Filed March 16, 1962

INVENTOR.
Harry C. Doane
BY
Paul J. Ethington
ATTORNEY

United States Patent Office 3,206,723
Patented Sept. 14, 1965

3,206,723
VEHICLE DUAL INTENSITY WARNING
SIGNAL CIRCUIT
Harry C. Doane, Grosse Pointe, Mich., assignor to General Motors Corporation, Detroit, Mich., a corporation of Delaware
Filed Mar. 16, 1962, Ser. No. 180,232
3 Claims. (Cl. 340—76)

This invention relates to a warning signal arrangement and more particularly to a variable intensity warning signal system.

Prior to the present invention is has been conventional practice to equip vehicles with warning signal lamps such as brake lamps and directional signal lamps to apprise the drivers of other vehicles of the intended behavior of that vehicle. During the daytime, however, and especially in bright sunlight, other drivers fail to notice these warning signals since they are not sufficiently bright to attract attention. While there have been attempts to ameliorate this condition by using lamps of greater intensity, the signals will then be so bright as to be blinding when operated at nighttime, hence being totally unsatisfactory.

It is the purpose of this invention to provide a warning signal system wherein the signal lamps will have a high intensity in the day time and a lower intensity at night thereby giving the optimum signal under either condition and improving vehicle safety.

It has previously been proposed to provide such dual intensity warning signals by varying the resistance of the signal circuits to change the light output of the lamp filaments. However, many difficulties arise from this method of varying the light intensity. One such disadvantage is that conventional turn signal flasher units are sensitive to changes in load so that the flashing frequency will change to an undesirable rate when the resistance of the circuit is changed. Another disadvantage is that variations in the voltage of the power supply for the lighting system causes a change in candle power of the lamp filaments and when a resistance is placed in series with the filament this condition is gravely aggravated.

The invention is carried out by providing signal lamps having a plurality of equal wattage filaments which produce different apparent signal light intensities, and switching means to select the appropriate filament or filaments for each ambient light condition.

Figure 1:
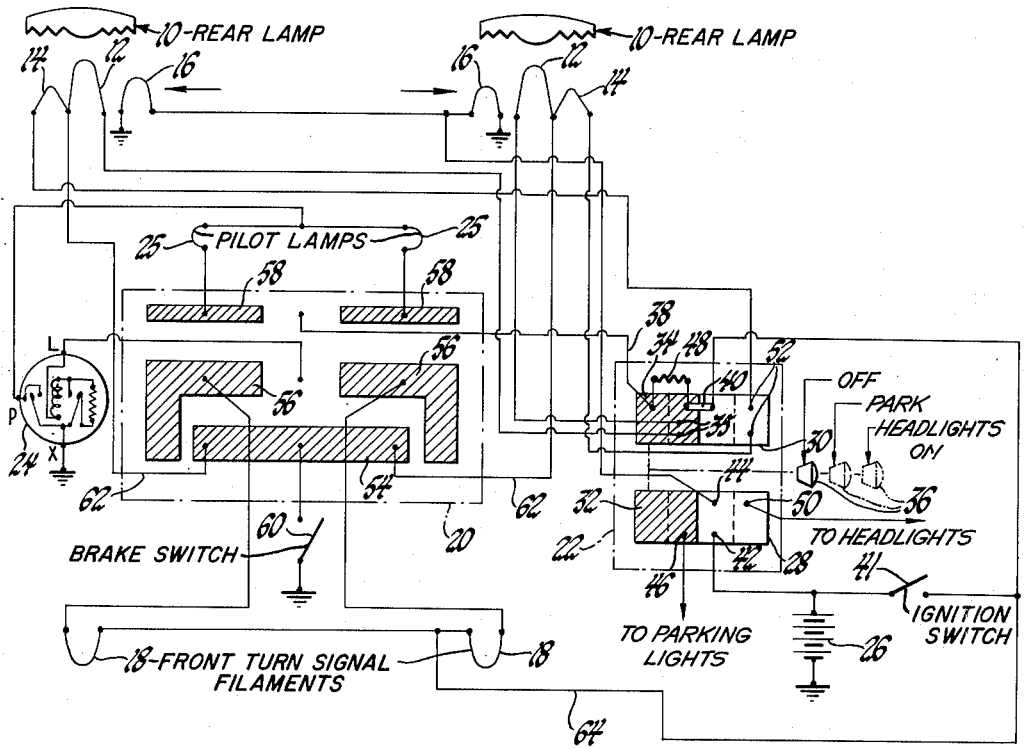
Figure 2:
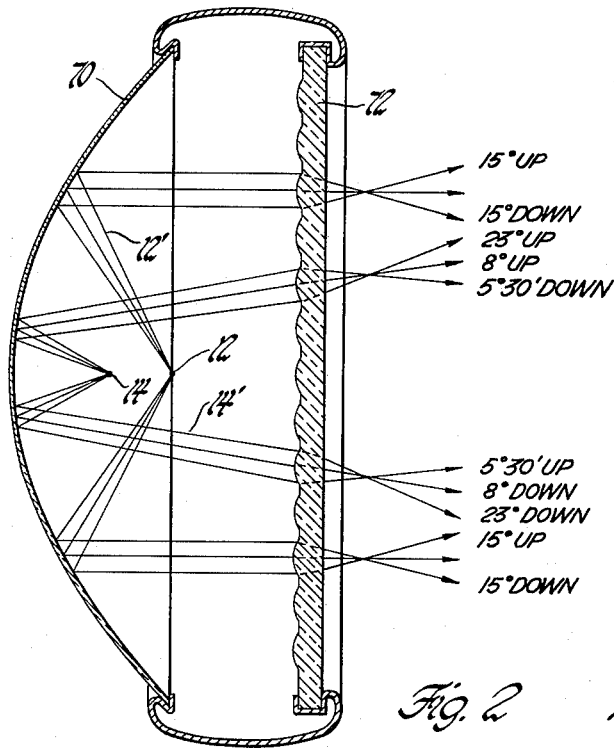

The above and other advantages will be made more apparent from the following specification taken in conjunction with the accompanying drawings in which:

FIGURE 1 is a schematic electrical diagram of a vehicle warning signaling circuit according to the invention; and FIGURE 2 is a schematic illustration of a dual brightness signal lamp according to the invention.

The circuit of FIGURE 1 comprises a pair of rear vehicle lamps 10 which include day signal filaments 12, night signal filaments 14. These lamps serve as turn signal lamps as well as stop signal lamps. The same lamps 10 may include the taillight filaments 16, although the taillight filaments 16 may be placed in separate lamps if desired. The signal system also includes the conventional front turn signal filaments 18 as well as a turn signal switch 20, a light switch 22, a flasher unit 24, a pair of pilot lamps 25 connected between the turn switch 20 and the flasher unit 24, and a battery 26.

The headlamp switch 22 comprises a main contact plate 28 and an auxiliary contact plate 30. The shaded area in the drawing represents slidable bridging contacts 32 and 34 which shift axially when the headlamp control knob 36 is manually moved. In the position shown in the drawing which corresponds to the "Off" position used for daylight driving, the bridging contact 34 on the auxiliary contact plate 30 effects connection of the filaments 12 via contacts 35 as well as a pilot light lead 38 to a contact 40 which in turn is connected through the ignition switch 41 to the battery 26. When the headlamp switch actuator 36 is moved to "Park" position, then the bridging contact 32 on the main contact plate 28 is moved one position to the right to connect the battery contact 42 to the taillight contact 44 and the parking light contact 46. On the auxiliary plate 30 when the bridging contact 34 moves to the right the filaments 12 remain connected to the battery contact 40. However, the pilot lamp lead 38 is no longer directly connected with contact 40, but rather a resistor 48 connects the pilot lead 38 to contact 40. When the headlamp switch actuator 36 is moved to its extreme right or "Headlights On" position, the sliding contacts 32 and 34 are moved so that the battery contact 42 is connected with the taillight contact 44 and a headlight contact 50 thereby permitting energization of the headlights and taillights, and the battery contact 40 is no longer connected with the filaments 12 but rather is connected with filaments 14 by way of contacts 52.

The turn signal switch 20 is of conventional design and includes a straight bridging contact 54 indicated by a shaded area, a pair of L-shaped bridging contacts 56, and a pair of straight contacts 58. These contacts 54, 56 and 58 are mechanically connected together to provide simultaneous movement of said contacts when the turn signal switch is moved. When the turn signal switch 20 is in central position as shown, the straight bridging contact 54 connects the grounded brake switch 60 to the ground wires 62 for the filaments 12 and 14. When the bridging contacts 54, 56 and 58 are moved, say to the right, then the straight bridging contact 54 connects the brake switch 60 with only the righthand filament ground wire 62 while the lefthand ground wire 62 as well as the front left turn signal lamp 18 is connected to the load terminal L of the flasher through the lefthand L-shaped bridging contact 56. At the same time one of the straight bridging members 58 connects the pilot lead wire 38 with the left pilot lamp 25 which in turn is connected to the pilot terminal P of the flasher unit. A lead wire 64 is always connected from the ignition switch to both the front turn signal lamps 18 so that these lamps will always be energized when the turn signal switch 20 is operated and the ignition switch is closed.

The filaments 12 and 14 have equal wattage ratings as well as equal candle power ratings. However, the day signal filament 12 is placed at the optical center of the lens so as to provide maximum optical efficiency and a bright apparent intensity as viewed from the rear of the lamp, but the night signal filament 14 is spaced from the optical center of the lens in such a locaiton as to produce an optically inefficient light pattern and hence a lower apparent intensity as viewed from the rear of the vehicle.

FIGURE 2 illustrates one embodiment of a dual intensity lamp having equal candle power filaments 12 and 14. The lamp includes a parabolic reflector 70 having its focal point coincident with the location of the day filament 12. The light rays 12' from the filament 12 are reflected from the reflector 70 in lines parallel to the axis of the reflector. The night filament 14 is located somewhat behind filament 12 so that its reflected rays 14' are divergent. As shown in the drawings, the rays 14' diverse 8° with the horizontal. A fluted spreading lens 72 in front of the reflector 70 spreads the rays 12' about 15° on either side of the horizontal to produce a cone of light with a total spread of 30°. The divergent rays 14' are spread even further by the lens 72. As shown, the rays 14' are spread as far as 23° above the horizontal for the upper rays and 23° below the horizontal for the lower rays. Hence a total spread of 46° is attained. Obviously then the beam from filament 14 is of lower intensity than that of filament 12 since it is spread over a greater angle.

In operation, when the headlight switch 22 is in "Off" position and the turn signal switch is in central position, the stop lights may be operated by closing brake switch 60 thereby permitting current to flow from the battery through the ignition switch 41, the battery contact 40, the day signal filaments 12, the filament ground wire 62, the bridging contact 54, and brake switch 60 to ground thereby illuminating the filaments 12 to provide a high intensity illumination of lamps 10. When the contacts 54, 56, 58 of the turn signal switch 20 are moved to the right then the right rear signal lamp may still be energized by closing the brake switch 60 as described above. However, the left rear signal will be connected to ground through the flasher 24 and the left L-shaped bridging contact 56 to thereby provide a periodic energization of the lefthand filament 12 and thus afford an intense flashing signal. Simultaneously the left front signal lamp 18 is grounded through the flasher 24 and will flash in phase with the rear lamp 10. The full battery voltage will be applied to the left pilot light 25 since current will flow from the battery contact 40 through the lead wire 38, the bridging contact 58, pilot lamp 25, and the pilot terminal P of the flasher 24 to ground thereby illuminating the left pilot lamp 25 with full intensity.

When the light switch 22 is moved to "Park" position to cause illumination of the parking lights and taillights, the brake signals and turn signals will operate as before. However, the resistor 48 between the battery contact 40 and the pilot lamp lead wire 38 is no longer shunted out so that the voltage applied to the pilot lamp 25 upon actuation of the turn signal will be reduced thereby causing a reduction in the intensity of the pilot lamps.

When the light switch 22 is moved to full "On" position to energize its headlights, then the day signal filaments 12 of lamps 10 will no longer be connected to battery terminal 40, but rather, night signal filaments 14 will be connected thereto. Then when the brake switch or turn signal switch is actuated the filaments 14 will be grounded through the circuit described above for the grounding of filaments 12 thereby causing illumination of filaments 14 to indicate a turn or application of the vehicle brakes. However, since the filaments 14 are located with respect to the lenses of lamps 10 so that they are optically inefficient, the intensity of illumination of lamps 10 will appear to be much lower than when filaments 12 are energized. However, since the filaments 12 and 14 are of equal wattage and hence draw the same current, the flasher 24, whose frequency of operation depends upon filament current, will not be affected by the change of filaments. It will be noted that no provision has been made to change the apparent intensity of the front turn signal lamps but rather they have a high intensity for both day and night operation. Since their proximity to the lighted headlamps considerably reduces the visual contrast, the eye becomes more tolerant of the high intensity of the signal lamps.

It will thus be seen that the invention provides a greatly improved warning signal light circuit by permitting the optimum illumination of the rear signal lights as well as the pilot lights for both day and night operation, and that the invention is carried out by using a switching mechanism which causes automatic appropriate selection of the lamp intensity without any positive act of the vehicle operator other than the conventional act of merely turning on the parking lights or headlights. Of course, the principles of the invention may be applied to the automatic electronic light switching devices as well as the manual switching system described herein.

The embodiment of the invention described herein is for purposes of illustration and the scope of the invention is intended to be limited only by the following claims.

I claim:

1. A dual intensity vehicle warning signal system comprising a power source, a signal lamp, a plurality of substantially equal wattage filaments in said lamp, one of the filaments being located near the focal point of said lamp, others of said filaments being spaced from the focal point of said lamp thereby being optically inefficient to produce lesser degrees of lamp brightness, a headlight circuit including a headlight switch, and switch means mechanically connected with the headlight switch for selectively connecting said filaments to said power source upon operation of the headlight switch.

2. A dual intensity vehicle warning signal system comprising a power source, a signal lamp, a pair of substantially equal wattage and candle power filaments in said lamp, one of the filaments being located near the focal point of said lamp, the other of said filaments being spaced from the focal point of said lamp thereby being optically inefficient, a headlight circuit including a headlight switch, switch means mechanically connected with the headlight switch for selectively connecting one of the filaments to one side of said power source upon operation of the headlight switch, and switch means for connecting said one filament to the other side of the power source.

3. A dual intensity vehicle warning signal system comprising a power source, a plurality of warning lamps, each of said lamps having a pair of equal wattage filaments, one of said filaments producing a greater apparent signal light intensity than the other filament, a light switching means for selectively connecting one side of the filaments to one side of the power source, a flasher connected to the other side of the power source, brake signal switch means also connected to the other side of the power source, and turn signal switch means for connecting the other side of the filaments to the other side of the power source through the flasher and the brake signal switch selectively.

References Cited by the Examiner

UNITED STATES PATENTS

| | | | |
|---|---|---|---|
| 1,229,474 | 6/17 | Kenyon | 240—41.25 |
| 1,686,859 | 10/28 | Huntington | 315—82 |
| 2,186,911 | 1/40 | Erickson | 340—76 |
| 2,245,790 | 6/41 | Koubek et al. | 340—84 |

NEIL C. READ, *Primary Examiner.*

THOMAS B. HABECKER, *Examiner.*